United States Patent
Gstoettenbauer et al.

(10) Patent No.: US 9,903,697 B2
(45) Date of Patent: Feb. 27, 2018

(54) METHOD AND APPARATUS FOR THE NON-CONTACT SUPPORT OF A SENSOR AND/OR ACTUATOR DEVICE

(71) Applicant: voestalpine Stahl GmbH, Linz (AT)

(72) Inventors: Norbert Gstoettenbauer, Engerwitzdorf (AT); Leopold Stegfellner, Wartberg ob der Aist (AT); Gunter Lengauer, Gallneukirchen (AT)

(73) Assignee: voestalpine Stahl GmbH, Linz (AT)

( * ) Notice: Subject to any disclaimer, the term of this patent is extended or adjusted under 35 U.S.C. 154(b) by 114 days.

(21) Appl. No.: 14/906,629

(22) PCT Filed: Jul. 22, 2014

(86) PCT No.: PCT/EP2014/065749
§ 371 (c)(1),
(2) Date: Jan. 21, 2016

(87) PCT Pub. No.: WO2015/011154
PCT Pub. Date: Jan. 29, 2015

(65) Prior Publication Data
US 2016/0163307 A1    Jun. 9, 2016

(30) Foreign Application Priority Data
Jul. 22, 2013    (EP) .................................... 13177497

(51) Int. Cl.
*G01B 5/00*    (2006.01)
*G01B 7/30*    (2006.01)
(Continued)

(52) U.S. Cl.
CPC ........... *G01B 5/0002* (2013.01); *G01D 11/02* (2013.01); *G10K 15/00* (2013.01)

(58) Field of Classification Search
CPC ........ G10K 15/00; G01D 11/02; G01B 11/06; G01B 7/10; G01B 21/08; G01B 2210/44;
(Continued)

(56) References Cited

U.S. PATENT DOCUMENTS 5,238,170 A * 8/1993 Nuss ..................... B23K 20/10
                                                              156/580.2
5,355,083 A * 10/1994 George ................. G01B 7/023
                                                              324/226

FOREIGN PATENT DOCUMENTS

DE        34 35 908 A1     4/1986

OTHER PUBLICATIONS

International Search Report of PCT/EP2014/065749, dated Sep. 10, 2014.
(Continued)

*Primary Examiner* — Harshad R Patel
*Assistant Examiner* — Brandi Hopkins
(74) *Attorney, Agent, or Firm* — Collard & Roe, P.C.

(57) ABSTRACT

A method and an apparatus for the non-contact support of a sensor and/or actuator device with respect to a substrate which reflects sound at least in regions has a moving suspension device, a sensor and/or actuator device which is mechanically connected to the suspension device, and a positioning device which is mechanically connected to the suspension device and which has at least one non-contact bearing for the non-contact support of the sensor and/or actuator device with respect to the substrate. The positioning device has at least one sonotrode for emitting an ultrasonic field which, between the sonotrode and the substrate, forms acoustic levitation waves for the non-contact support of the sensor and/or actuator device with respect to the substrate by a non-contact bearing which is designed as an ultrasonic bearing.

18 Claims, 4 Drawing Sheets

(51) Int. Cl.
*G01D 11/02* (2006.01)
*G10K 15/00* (2006.01)

(58) Field of Classification Search
CPC .... G01B 21/30; G01B 2210/42; G01N 27/72; G01N 21/84; G01N 27/22; G01N 27/02; G01N 21/25; G01N 21/89; G01N 33/346; F16C 32/0603; B23K 26/362; B23Q 1/38; B65H 2511/13; B65H 2220/11; Y10S 33/01; Y10S 33/02
USPC ....... 73/866.5, 159, 618; 324/229, 226, 230, 324/260, 207; 356/602, 631
See application file for complete search history.

(56) References Cited

OTHER PUBLICATIONS

Su Zhao et al: "A standing wave acoustic levitation system for large planar objects", Archive of Applied Mechanics, Springer, Berlin, DE, vol. 81, No. 2, Dec. 15, 2009, pp. 123-139.

\* cited by examiner

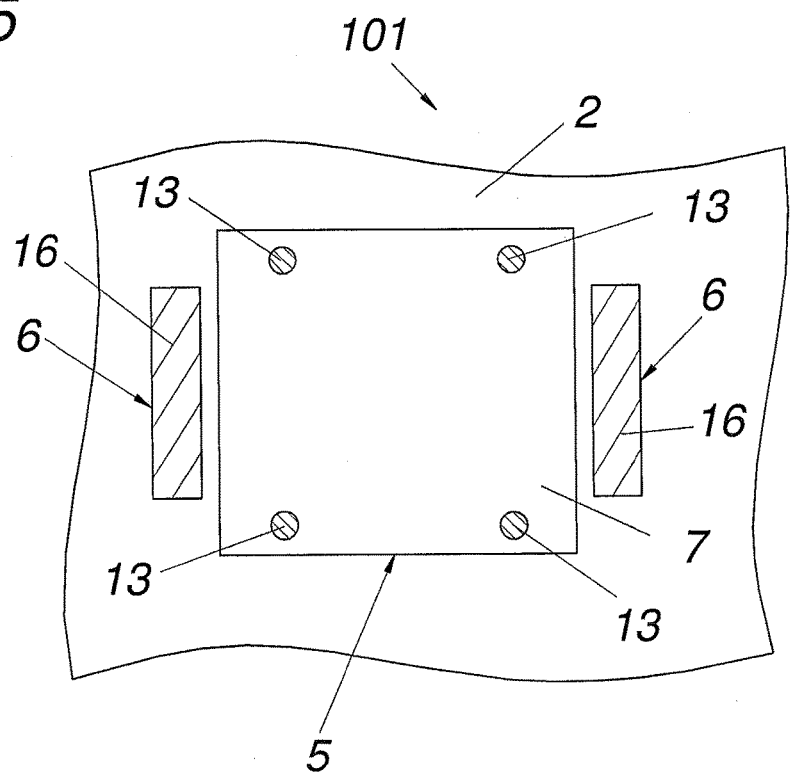
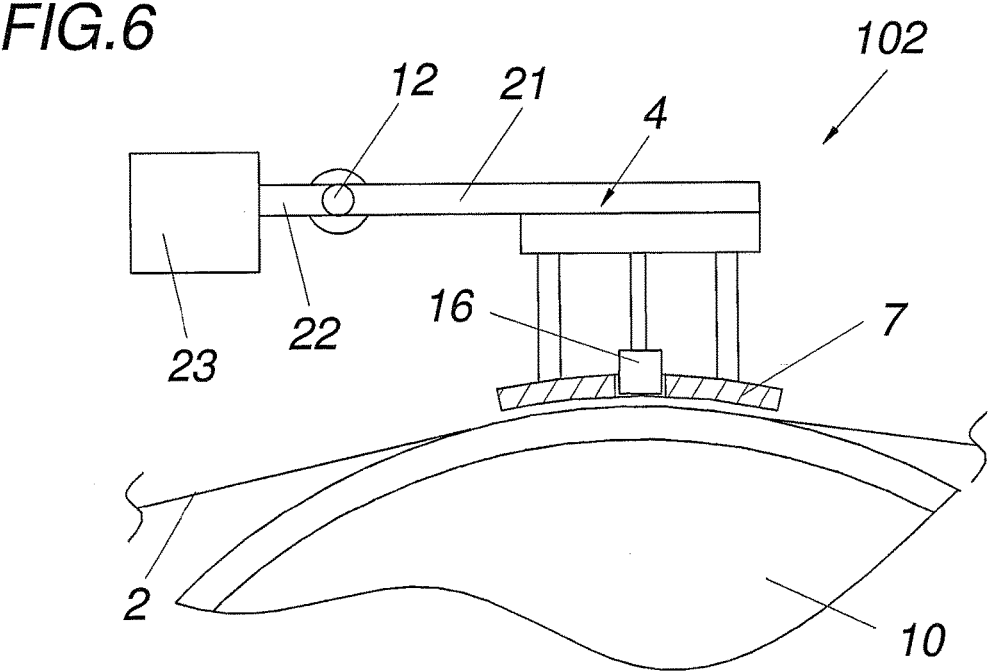

METHOD AND APPARATUS FOR THE NON-CONTACT SUPPORT OF A SENSOR AND/OR ACTUATOR DEVICE

CROSS REFERENCE TO RELATED APPLICATIONS

This application is the National Stage of PCT/EP2014/065749 filed on Jul. 22, 2014, which claims priority under 35 U.S.C. § 119 of European Application No. 13177497.8 filed on Jul. 22, 2013, the disclosure of which is incorporated by reference. The international application under PCT article 21(2) was not published in English.

TECHNICAL FIELD

The invention relates to a method and an apparatus for contact-free mounting of a sensor device and/or actuator device relative to a substrate that reflects sound at least in certain regions, particularly sheet metal, having a movable suspension, having a sensor device and/or actuator device mechanically connected with the suspension, and having a positioning device mechanically connected with the suspension, which device has at least one contact-free bearing for contact-free mounting of the sensor device and/or actuator device relative to the substrate.

STATE OF THE ART

Sensor devices having sensors for contact-free recording of measurement values are needed, among other things, if material for which the measurement data are supposed to be recorded is continuously moved, or if the risk exists that the material and/or the sensor will be damaged by reciprocal contact. If a defined distance is supposed to be maintained between moving material and sensor, it is known from DE3435908A1 to configure a spacing between sensor device and material, using air cushions. It is a disadvantage, in this connection, that an additional operating medium, namely compressed air, must be made available to generate the air cushion; production of this compressed air continuously causes increased operating costs, among other things. In addition, the distance between sensor or sensor device and material is dependent on the thickness of the air cushion, which in turn is influenced by pressure and amount of the air flowing out. Therefore adjustment of the distance between sensor and material becomes comparatively complicated, and is additionally dependent on variations in the supply of media.

PRESENTATION OF THE INVENTION

The invention is therefore based on the task of improving an apparatus, proceeding from the state of the art described initially, to the effect that a constant distance between sensor device and/or actuator device and substrate, particularly moving substrate, can be guaranteed in simple and reliable manner. Furthermore, this apparatus is supposed to cause low current costs during operation.

The invention accomplishes the stated task with regard to the apparatus in that the positioning device has at least one sonotrode for emission of an ultrasonic field, which field forms acoustic levitation waves between sonotrode and substrate for contact-free mounting of the sensor device and/or actuator device relative to the substrate, by way of a contact-free bearing structured as an ultrasonic bearing.

If the positioning device has at least one sonotrode for emission of an ultrasonic field, an extremely constant distance between sensor device and/or actuator device and substrate that reflects sound at least in certain regions can be made possible, because acoustic levitation waves can form between sonotrode and substrate for contact-free mounting of the sensor device and/or actuator device, by way of a contact-free bearing structured as an ultrasonic bearing. Furthermore, in this way the distance between sensor device and/or actuator device and substrate can be maintained and, above all, particularly also kept constant, without using an additional operating medium. Specifically, the movable suspension of sensor device and/or actuator device as well as positioning device allows the ultrasonic field emitted by the sonotrode to set the distance between sensor device and/or actuator device and substrate, particularly even if the substrate is being moved. In this way, the positioning device forms an ultrasonic bearing in the near field, which bearing holds the sensor device and/or actuator device at a precise distance from the substrate. Because electrical current for generation of the ultrasonic field is available in practically every sensor device, the ultrasonic bearing can be constructed without additional operating medium—aside from electrical energy for generation of the ultrasonic field. The apparatus according to the invention can therefore be used in extremely flexible manner, so that its installation can be carried out even in areas of a system in which no special operating means such as compressed air or another media supply, for example, are available or permitted. Specifically, it is sufficient for the invention if a gaseous medium that is suitable for transfer of ultrasound is present between sonotrode and substrate. In this way, installation effort and costs can be reduced, on the one hand, but also, the effort with regard to ongoing operation can be lowered.

In general, it should be stated that substrates that reflect sound at least in certain regions can be understood to be those substrates that have a greater wave resistance relative to the adjacent medium, which adjacent medium, particularly gases, gas mixtures, inert gases or air, in particular, is therefore understood to be sound-absorbent. Metallic substrates, particularly sheet metals, preferably sheet steels, are particularly suitable as substrates that reflect sound at least in certain regions. These metallic substrates can be coated or uncoated. However, use of the apparatus for other metallic products, semi-finished products or their precursor materials is just as conceivable. Also, the invention can be suitable for substrates that reflect sound at least in certain regions and are composed of glass, ceramic, or their composite materials. Furthermore, a sensor device can be any device for recording measurement data from a substrate that reflects sound at least in certain regions. For example, inductive sensors, temperature sensors, digital sensors and the like. An actuator device can be understood to be any device with which it is possible to act on the metallic substrate—for example the latter is imprinted, cleaned, oiled or the like.

If the sonotrode has an opening for at least one sensor and/or actuator of the sensor device and/or actuator device, the sensor and/or actuator can be completely surrounded by the sonotrode laterally, thereby making it possible to form and maintain a particularly uniform and constant mounting. Furthermore, in this way it is possible to make mechanical protection of the sensor device and actuator device available.

If a sensor and/or actuator projects at least partly into the opening of the sonotrode, with lateral play, this can improve recording of the measurement data. Specifically, spread of vibrations can be prevented or at least reduced because of the play between sensor and/or actuator and sonotrode. In this way, a sensor device and/or actuator device that works in particularly problem-free manner can be created, and this can also contribute to increasing the stability of the apparatus.

The sensor device and/or actuator device can furthermore become active beyond the edge of the sonotrode, if at least one sensor and/or actuator of the sensor device and/or actuator device is provided to the side of the sonotrode and with play relative to it. In particular, the edge region of the substrate can thereby become accessible to the sensor device and/or actuator device. Preferably, the sensors and/or actuators are disposed centered relative to the sonotrode, and this can be advantageous when recording data from edge regions of substrates, particularly in the case of sheet steel in the form of boards. Furthermore, the equilibrium state of the sonotrode can be maintained by means of this centering, and this makes a particularly robust and stable apparatus possible.

Positioning of the sensor device and/or actuator device by means of a sonotrode can particularly distinguish itself if the apparatus has a moving sheet metal, particularly sheet steel, as a substrate, and a deflection roller for guiding the moving substrate. Specifically, it is known that moving sheet metals are susceptible to vibrations—however, according to the invention, it is possible to ensure precise positioning of the sensor device and/or actuator device, by means of a sonotrode.

If not only the sensor and/or actuator of the sensor device and/or actuator device but also the sonotrode are disposed above the substrate, this can lead to advantages with regard to design simplicity and stability of the apparatus. Specifically, if the sensor device and/or actuator device is positioned at a distance relative to the substrate from above, contaminants that might distort the measurement results and were caused on the underside of the substrate due to its transport will play only a slight role. Because of the ultrasonic bearing that has been generated, sensor device and/or actuator device can also be kept at a distance from the substrate from above if a corresponding part of the weight force of the sensor device and/or actuator device is compensated by means of a suspension. If the sensor device and/or actuator device and the sonotrode are disposed over or above the deflection roller, this can also improve recording of measurement data, because vibrations of the moving substrate occur only to a reduced degree in the region of the deflection roller. Furthermore, the sheet metal also cannot be pressed away by the ultrasonic bearing, because it is supported on the deflection roller, and this might make it possible to further reduce the vibration tendency of the substrate.

If not only at least the sensor and/or actuator of the sensor device and/or actuator device but also the sonotrode is disposed in the region of the substrate that is curved by the deflection roller, this can bring about a further improvement in the stability and functional reliability of the apparatus. Specifically, the substrate lies on the deflection roller over its full area in the curved region, and this can additionally prevent the vibrations that are caused by the ultrasonic bearing.

If the sonotrode has a base surface that is curved at least in certain regions, this can have a particularly advantageous effect during positioning on the deflection roller. A uniform bearing distance between sonotrode and sensor device and/or actuator device and the substrate can be made possible by means of a curved base surface of the sonotrode. It is advantageous if the curvature of the base surface corresponds to the curvature of the sheet metal deflected on the deflection roller, taking into consideration the gap between sheet metal and sonotrode.

If the positioning device and the sensor device and/or actuator device are mounted so as to rotate, by way of the suspension, this can allow additional possibilities of use of the sensor device and/or actuator device under some circumstances. Using a sensor device and/or actuator device equipped in this manner, it is possible to reliably hold a substrate in position even if it is moved or positioned in deviation from the horizontal.

Placement of the sonotrode against the substrate can take place passively, if a relief weight is provided on the other lever arm that is separated from the lever arm with the sonotrode, by way of the pivot bearing.

If the suspension is mechanically connected with the sonotrode by way of at least one vibration node of the sonotrode, this can increase the stability of the sensor device and/or actuator device. Specifically, the ultrasonic vibrations of the sonotrode therefore cannot be transferred to the sensor device and/or actuator device by way of the suspension, because a slight to actually negligible amplitude of the ultrasonic vibrations can be expected in these vibration nodes.

If the suspension has at least one linear guide, the sensor device and/or actuator device can be positioned in improved manner relative to the substrate—for example with a horizontal and vertical linear guide over the entire width of the substrate. In addition, a vertical linear guide allows a first distance setting between sensor device and/or actuator device and substrate to be performed, because the ultrasonic bearing can only become active in the near field of the sonotrode. Reliable adherence to the minimal distance can then take place by means of the ultrasonic bearing produced by the ultrasonic waves.

The sonotrode can be given a certain freedom of movement in its attachment if the suspension has a spring bearing.

If the sensor device and/or actuator device has an inductive sensor, particularly an eddy current sensor, the recorded measurement data of a steel sheet can check the steel sheet for defects and contaminants. Furthermore, such sensors are comparatively insensitive to adverse ambient influences, which can particularly occur in the case of a moving steel sheet.

It is furthermore a task of the invention to simplify a method for positioning of a sensor device and/or actuator device above a moving substrate, of the type described initially, and to keep the current operating costs low, in this connection.

The invention accomplishes the stated task with regard to the method in that an ultrasonic field is emitted for an ultrasonic bearing, using at least one sonotrode, and that acoustic levitation waves are generated between sonotrode and moving substrate, in order to thereby keep the sensor device and/or actuator device, which is mechanically connected with the sonotrode, at a distance from the substrate.

If at least one sonotrode emits an ultrasonic field, and if acoustic levitation waves are thereby generated between sonotrode and moving substrate, which reflects sound at least in certain regions, the position of the sensor device and/or actuator device can be adjusted in elegant, stable, and precise manner, if the sensor device and/or actuator device that is mechanically connected with the sonotrode is kept at a distance from the substrate by means of the ultrasonic bearing produced in this manner. Furthermore, in this way it is possible to prevent the substrate from being touched by the sensor device and/or actuator device, at all times. Furthermore, the bearing produced by means of the near-field effect in ultrasound can allow at approach of the sensor device and/or actuator device at very slight distances, without the risk of contact. Therefore a simple, stable, and reliable method for positioning of a sensor device and/or actuator device above a moving substrate can be created by means of the use of a sonotrode for generation of an ultrasonic bearing.

BRIEF DESCRIPTION OF THE DRAWINGS

In the figures, the invention is shown in greater detail as an example, using several embodiment variants. The figures show.

WAY TO IMPLEMENT THE INVENTION

Figure 1:
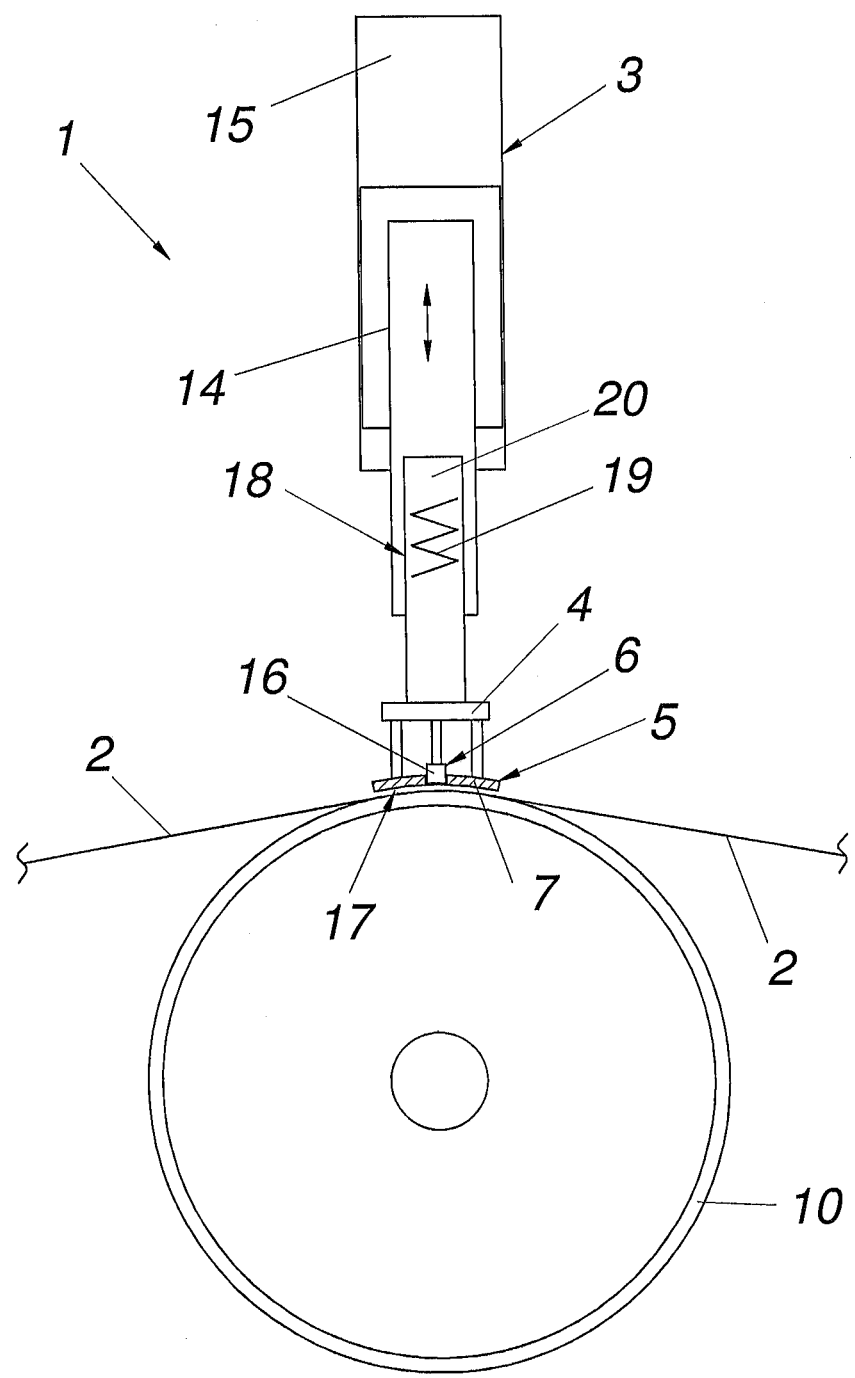
FIG. 1 a sectional view of an apparatus according to a first exemplary embodiment, FIG. 2 an enlarged detail of FIG. 1, of positioning device, sensor device, and suspension, FIG. 3 a sectional view corresponding to in FIG. 2, FIG. 4 a view of an apparatus according to a second exemplary embodiment, FIG. 5 a view of a positioning device, sensor device, and suspension according to a third exemplary embodiment, and FIG. 6 a partial view of an apparatus according to a fourth exemplary embodiment.

According to FIG. 1, a section through a side view of an apparatus 1 according to a first exemplary embodiment is shown as an example. This apparatus 1 has a moving substrate 2 that reflects sound, namely a steel sheet, and a module 3. The module 3 comprises a movable suspension 4, with which both a positioning device 5 and a sensor device 6 are mechanically connected. It is conceivable to provide an actuator device 6 instead of or in addition to the sensor device 6, but this has not been shown for the sake of clarity. The sensor device 6 is positioned or held in contact-free manner relative to the substrate 2.

According to the invention, this is achieved in that a sonotrode 7 of the positioning device 5 emits an ultrasonic field. The acoustic levitation waves brought about by the ultrasonic field form an ultrasonic bearing 17 in the gap 8, see FIG. 2, between sensor device 6 and moving substrate 2. Accordingly, the distance between sensor device 6 and moving substrate 2 is set, without an additional operating medium being required for this purpose. As a result, simplifications can be achieved during installation, as can a cost reduction in ongoing operation.

Figure 2:
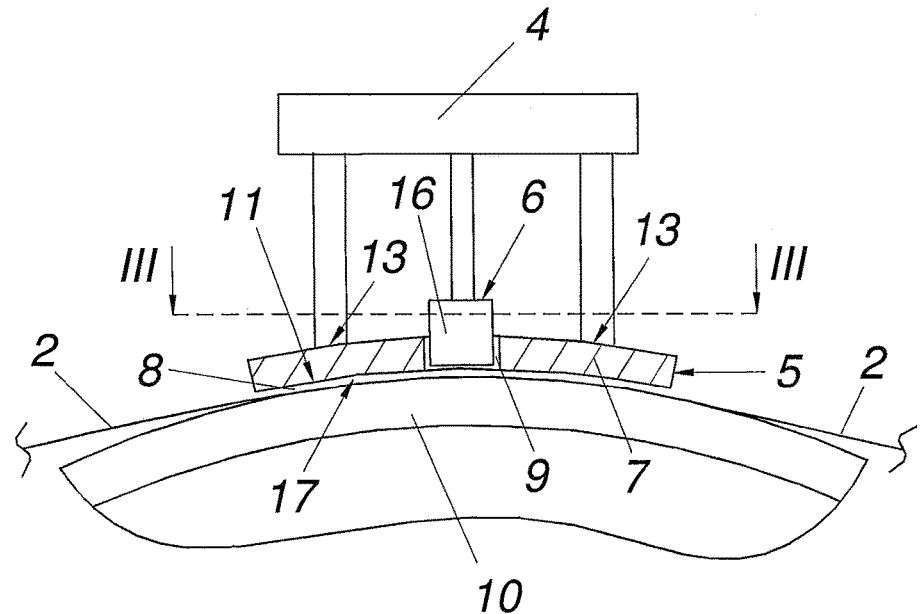
Figure 3:
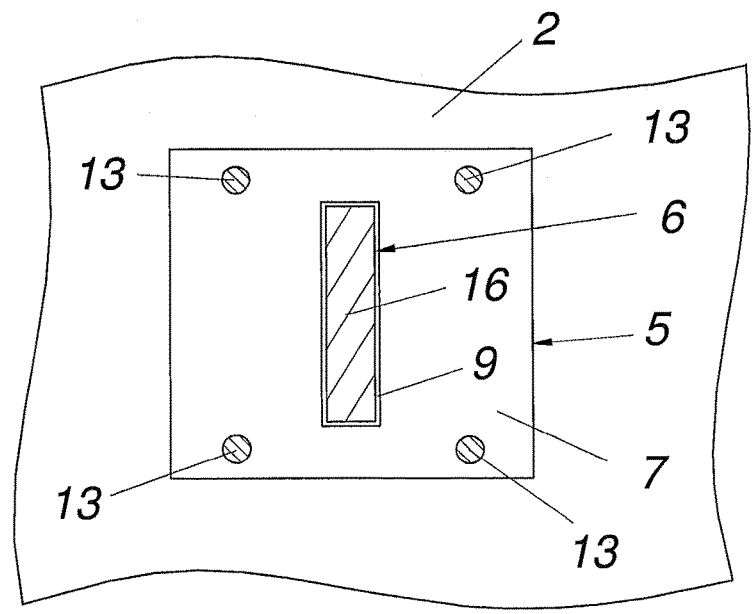

As can be derived in detail from FIGS. 2 and 3, among other things, the sonotrode 7 has an opening 9 for the sensor device 6 or its sensor 16. The sensor 16 projects into this opening 9 with lateral play, in order to record measurement data of the substrate 2. Because the sensor 16 is surrounded by the sonotrode 7 on all side surfaces, a uniform ultrasonic bearing 17 is also guaranteed between the sensor device 6 and moving substrate 2.

Although the sensor device 6 can have any kind of sensor 16, eddy current sensors are particularly well suited for measurements of the substrate 2.

With the placement of the sensor device 6 and sonotrode 7 above the substrate 2, specifically in the region of the substrate 2 that is curved by the deflection roller 10—as can be seen in FIG. 1—the advantage that the substrate 2 lies on the deflection roller 10 with its full area in the region of the sensor device 6 can be utilized. For this reason, the substrate 2 cannot be moved out of its position or location by the forces caused by the ultrasonic bearing 17. Thus, the forces can act only on the positioning device 5, and hold the latter at a fixed distance from the substrate 2, according to the invention. Vibrations of the substrate 2 are thereby excluded, and therefore guarantee a stable apparatus and precise recording of measurement data. Because the sonotrode 7 generates the ultrasonic bearing 17 in the curved region of the substrate 2, the sonotrode 7 has a curved base surface 11 that approximately corresponds to the curvature of the sheet metal curved by means of the deflection roller 10. By means of the curved base surface 11, a uniform gap 8 for the ultrasonic bearing 17 can be guaranteed even in the case of positioning over or above the deflection roller 10.

Figure 4:
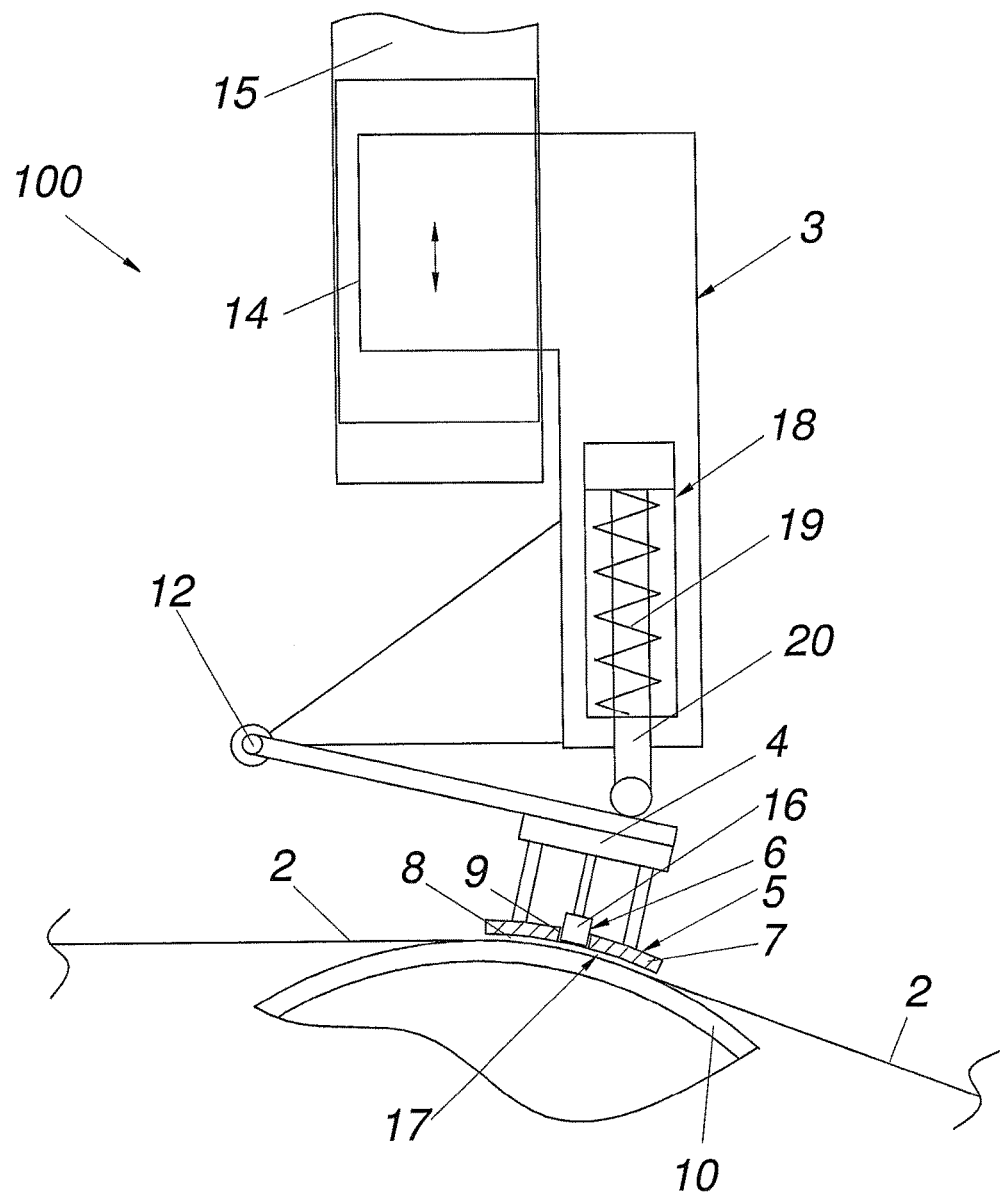

As is shown in the second exemplary embodiment according to FIG. 4, the suspension 4 is mounted so as to rotate, above the point of rotation 12 of the module 3. In this way, the positioning device 5 of the apparatus 100 can be precisely mounted and positioned in the curved region of the substrate 2, even in the region of the deflection roller 10. This positioning and also the mounting can take place not only by way of the rotatable bearing 12, but also with the support of the horizontal linear guide 14 and vertical linear guide 15.

As can furthermore be derived from FIG. 3, the sonotrode 7 is connected with the suspension 4 at the vibration nodes 13. With the selection of the vibration node points 13 as the engagement points for the suspension 4, transfer of the ultrasonic vibrations to the remaining part of the module 3 is advantageously prevented. Thus, measurement values can be recorded by the sensor device 6 without the disruptive influence of the sonotrode vibrations, according to the invention.

Furthermore, a spring bearing 18 can be recognized in FIGS. 1 and 4, in the mechanical attachment of the positioning device, which bearing acts on movements of the sonotrode 7, to compensate them. This spring bearing 18 comprises a spring 19, in a simple design, and a guide rod 20 on which the latter places stress, wherein other embodiments are, of course, just as conceivable.

In the third exemplary embodiment according to FIG. 5, the apparatus 101 has two sensors 16 on the side, next to the sonotrode 7, specifically with play relative to the sonotrode 7. The two sensors 16 are centered relative to the side surface of the sonotrode 7, in order to thereby maintain the center of gravity of the apparatus in the region of the sonotrode. With regard to FIG. 5, it is also conceivable to provide actuators. Furthermore, the sonotrode 7 can also have an opening for further sensors 16 and actuators, as can be seen in FIG. 3—however, this is not shown in any detail in FIG. 5.

In general, it should be mentioned that of course, multiple sonotrodes 7 can also be provided next to one another, with sensors and/or actuators in their intermediate regions and/or in openings on the sonotrodes.

In general, it should be mentioned that a regulation device and/or control device can also be assigned to the apparatus, in order to act on the emission behavior of the sonotrode by way of recorded sensor signals—whether from additional sensors and/or by way of the sonotrode itself—for example to set or regulate the actual distance to a desired distance. These sensor signals can contain distance measurement data, for example, and/or other measurement data dependent on the distance, by way of which a conclusion can be drawn regarding the actual distance between sonotrode and substrate, but this has not been shown in any detail.

According to FIG. 6, a further apparatus 102 according to a fourth exemplary embodiment is shown. This apparatus 102 makes do with passive measures for positioning of the sonotrode 7, in that in comparison with the embodiments according to FIGS. 1 and 4, linear guides have been eliminated. Thus, the apparatus 102 according to FIG. 6 has two lever arms 21 and 22 on the suspension 4, which arms follow the common pivot bearing 12. The lever arm 21 carries the sonotrode 7, wherein a relief weight 23 is provided on the other lever arm 22. In this way, weight relief of the sonotrode 7 is made possible, and this advantageously reduces the control effort and also the power consumption of the sonotrode 7, for contact-free mounting of the sensor 16 relative to the substrate 2.

The invention claimed is:

1. An apparatus for contact-free mounting of a sensor device and/or actuator device relative to a substrate that reflects sound comprising:
   a movable suspension, wherein the sensor device and/or actuator device is mechanically connected with the suspension; and
   a positioning device, wherein the positioning device is mechanically connected with the suspension,
   wherein the positioning device has at least one contact-free bearing for contact-free mounting of the sensor device and/or actuator device relative to the substrate,
   wherein the positioning device has at least one sonotrode for emission of an ultrasonic field, which field forms acoustic levitation waves between sonotrode and the substrate for contact-free mounting of the sensor device and/or actuator device relative to the substrate, by way of a contact-free bearing structured as an ultrasonic bearing.

2. The apparatus according to claim 1, wherein the sonotrode has an opening for at least one sensor and/or actuator of the sensor device and/or actuator device.

3. The apparatus according to claim 2, wherein the at least one sensor and/or actuator projects at least partly into the opening of the sonotrode.

4. The apparatus according to claim 1, wherein the at least one sensor and/or actuator of the sensor device and/or actuator device is provided to a side of the sonotrode and with play relative to the sonotrode.

5. The apparatus according to claim 1, wherein the apparatus has a moving sheet metal as the substrate, and a deflection roller for guiding the substrate.

6. The apparatus according to claim 5, wherein not only the at least one sensor and/or actuator of the sensor device and/or actuator device but also the sonotrode are disposed above the substrate.

7. The apparatus according to claim 5, wherein not only at least one sensor and/or actuator of the sensor device and/or actuator device but also the sonotrode are disposed in a region of the substrate that is curved by the deflection roller.

8. The apparatus according to claim 7, wherein the sonotrode has a base surface that is curved.

9. The apparatus according to claim 5, wherein not only the at least one sensor and/or actuator of the sensor device and/or actuator device but also the sonotrode are disposed above the deflection roller.

10. The apparatus according to claim 1, wherein the positioning device and the sensor device and/or actuator device are mounted so as to rotate, by way of the movable suspension.

11. The apparatus according to claim 10, wherein a relief weight is provided on a second lever arm that is separated from a first lever arm with the sonotrode, by way of a pivot bearing.

12. The apparatus according to claim 1, wherein the movable suspension is mechanically connected with the sonotrode by way of at least one vibration node of the sonotrode.

13. The apparatus according to claim 1, wherein the suspension has at least one linear guide.

14. The apparatus according to claim 1, wherein the suspension has a spring bearing.

15. The apparatus according to claim 1, wherein the sensor device and/or actuator device has an inductive sensor.

16. The apparatus according to claim 1, wherein the substrate is sheet metal.

17. A method for contact-free mounting of a sensor device and/or actuator device relative to a moving substrate, which reflects sound, the method comprising:
   keeping the sensor device and/or actuator device at a distance from the substrate by way of a contact-free bearing,
   emitting an ultrasonic field for an ultrasonic bearing, using at least one sonotrode mechanically connected with the sensor device and/or actuator device, and
   generating acoustic levitation waves between the at least one sonotrode and the moving substrate, thereby keeping the sensor device and/or actuator device at a distance from the substrate.

18. The method according to claim 17, wherein the substrate is sheet metal.

* * * * *